United States Patent
Ha et al.

(10) Patent No.: US 7,639,208 B1
(45) Date of Patent: Dec. 29, 2009

(54) COMPACT OPTICAL SEE-THROUGH HEAD-MOUNTED DISPLAY WITH OCCLUSION SUPPORT

(75) Inventors: Yonggang Ha, Oviedo, FL (US); Jannick Rolland, Chuluota, FL (US); Ozan Cakmakci, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 673 days.

(21) Appl. No.: 11/129,620

(22) Filed: May 13, 2005

Related U.S. Application Data

(60) Provisional application No. 60/573,529, filed on May 21, 2004.

(51) Int. Cl.
*G09G 5/00* (2006.01)
(52) U.S. Cl. .................. 345/8; 345/7; 345/9; 345/204; 359/630; 359/632
(58) Field of Classification Search ............ 345/8, 345/9, 204; 359/630, 632
See application file for complete search history.

(56) References Cited

U.S. PATENT DOCUMENTS

| | | | | |
|---|---|---|---|---|
| 5,526,184 A | | 6/1996 | Tokuhashi et al. ........... 359/630 |
| 5,625,372 A | * | 4/1997 | Hildebrand et al. ............ 345/8 |
| 6,037,914 A | | 3/2000 | Robinson ....................... 345/7 |
| 6,278,418 B1 | * | 8/2001 | Doi ............................... 345/7 |
| 6,456,262 B1 | * | 9/2002 | Bell ............................... 345/8 |
| 6,672,721 B2 | * | 1/2004 | Aastuen et al. ................ 353/31 |
| 6,822,643 B2 | * | 11/2004 | Matsui et al. ................ 345/204 |
| 7,023,602 B2 | * | 4/2006 | Aastuen et al. ............. 359/247 |

OTHER PUBLICATIONS

Application Guide for CRL Opto SXGA FLCOS displays, CRL Opto Limited, United Kingdom (2003) [online]. [retrieved on May 2, 2005]. Retrieved from: http://www.crlopto.products/product_support.htm.
SXGA Field Sequential Color Application Note, CRL Opto Limited, United Kingdom (2003) [online]. [retrieved on May 2, 2005]. Retrieved from: http://www.crlopto.products/product_support.htm.

(Continued)

*Primary Examiner*—Henry N Tran
*Assistant Examiner*—Viet Pham
(74) *Attorney, Agent, or Firm*—Brian S. Steinberger; Phyllis K. Wood; Law Offices of Brian S. Steinberger, P.A.

(57) ABSTRACT

An optical system, apparatus and method are capable of mutual occlusions. The core of the system is a spatial light modulator (SLM) which allows users to block or pass certain parts of a scene which is viewed through the head worn display. An objective lens images the scene onto the SLM and the modulated image is mapped back to the original scene via an eyepiece. The invention combines computer-generated imagery with the modulated version of the scene to form the final image a user would see. The invention is a breakthrough in display hardware from a mobility (i.e. compactness), resolution, and speed, and is specifically, related to virtual objects being able to occlude real objects and real objects being able to occlude virtual objects.

11 Claims, 8 Drawing Sheets

OTHER PUBLICATIONS

Kocian, D.F., "Design considerations for virtual panoramic display (VPD) helmet systems," Armstrong Aerospace Medical Research Laboratory, Visual Display Systems Branch, Wright Patterson Airforce Base, Dayton, Ohio 45433-6573 (1988).

Eric W. Tatham, "Getting the best of both real and virtual worlds", Communications of the ACM, vol. 42, No. 9, Sep. 1999.

Kiyokawa et al., "An Occlusion-Capable Optical See-through Head Mount Display for Supporting Co-located Collaboration", ISMAR, (2003), pp. 133-141.

Rolland and Fuchs, "Optical versus video see-through head mounted displays in medical visualization", Presence vol. 9, No. 3, Massachusetts Institute of Technology, (2002), pp. 287-309.

Takayuki Uchida, et al., "An optical See-through MR Display with Digital Micro-Mirror Device", TVRSJ vol. 7 No. 2 pp. 151-158, (2002).

* cited by examiner

COMPACT OPTICAL SEE-THROUGH HEAD-MOUNTED DISPLAY WITH OCCLUSION SUPPORT

This application claims the benefit of priority from U.S. provisional patent application Ser. No. 60/573,529, filed on May 21, 2004 and was funded by the Office of Naval Research grant N00014-03-10667.

FIELD OF THE INVENTION

This invention relates to head-mounted displays, and in particular, to optical see-through head worn display systems, apparatus and methods that are capable of mutual occlusions, wherein virtual objects are able to occlude real objects and real objects are able to occlude virtual objects.

BACKGROUND AND PRIOR ART

Augmented reality can be defined as adding or subtracting information to the human senses. Visual augmentations can be superimposed with a head-worn display Head-Worn Displays allow full mobility and private access to information. Head worn displays can be classified into two classes, optical and video see-through as described by Rolland and Fuchs, Optical versus video see-through head mounted displays in medical visualization, Presence Vol. 9, No. 3, Massachusetts Institute of Technology, 2002, pp. 287-309.

Some scientists prefer video see through, primarily for technical reasons. For example, using chroma keying it is easy to add information to the scene and it is relatively easy to block out parts of the scene. From a human usability point of view, there are several issues with video see-through augmented reality such as lag due to processing of the incoming video stream in video see through augmented reality is a problem.

For optical see-through displays, most optical designs, even today, combine the computer generated imagery with the real world using a beam splitter. In the early prior art, showing "opaque" objects with hidden lines removed was beyond capability and the three-dimensional objects were transparent wire frame line drawings.

It is well established that a beam-splitter will reflect some percentage of the incoming light and transmit the rest. The percentage of transmission and reflection can be adjusted through coatings on the surfaces of the beam-splitter. However, regardless of the transmission/reflection percentages, some light is always transmitted from the scene under various non-zero illumination settings, which is the source of the occlusion problem. This transmitted light implies that with only a beam-splitter and an image source based display, it is optically challenging to create mutual occlusion of real and computer-generated objects.

Alternative mechanisms to the beam-splitter plus image source combination are necessary to achieve the continuum between transparency and opaqueness of virtual objects, which is necessary to create various occlusion percepts. To be concrete about this transparency and opaqueness continuum of virtual objects, a virtual object needs to be opaque when it is occluding a real object, and it needs to be transparent when it is occluded by an object in the real world scene. Between these two extremes of the continuum, partial occlusion and associated transparency occur. Current computer graphics techniques and hardware allow for "hidden line removal" or visible surface determination, however, the display of computer-generated "opaque" objects with optical see-through remains a problem.

At a coarse scale, the illumination of the outside world can be controlled uniformly for the entire scene. U.S. Pat. No. 5,526,184 illustrates this idea of uniform illumination control of the scene by using a liquid crystal shutter. It is conceivable that electrochromic films can be used for the same purpose. On a finer scale, the scene can be thought to be composed of portions, and each portion can be individually modulated. U.S. Pat. No. 6,037,914 issued to Robinson on Mar. 14, 2000 discloses a system where a transmission type device was utilized to block/pass certain parts of the scene. Soon after, Eric W. Tatham, "Getting the best of both real and virtual worlds", Communications of the ACM, Vol. 42, No. 9, September 1999, disclosed results from a transmissive light blocking arrangement with no imaging optics. An active mask was used to modulate the content of a scene and was combined with the display. Tatham further pointed to some potential benefits of using a Digital Micromirror Device (DMD) in place of the transmissive mask, yet no optical layout was proposed. Uchida, Sato and Inokuchi, "An optical See-through MR display with digital micro-mirror device, TVRSJ Vol. 7 No. 2, (2002), Abstract, shows a DMD based system in the proceedings of the Virtual Reality Society of Japan 2002. Uchida et.al's prototype benefits from the high contrast ratio of the DMD device, however, it is composed of three separate optical paths and further work is necessary to combine the paths for a head-mounted display application. However Kiyokawa et al., "An Occlusion-Capable Optical See-through Head Mount Display for Supporting Co-located Collaboration", ISMAR 2003: pp. 133-141 addressed the occlusion problem in their prototype, ELMO-1, which is currently in its fourth generation. Vivid images of mutual occlusion were first demonstrated by Kiyokawa et al. using a system with a transmissive spatial light modulator (SLM). ELMO-4 optics is based on a 320×240 transmissive liquid crystal display produced by Hunet that is reported to have a response time of 2 ms. The ELMO-4 optical system contains four lenses, two prisms, and three mirrors per eye for the display component.

The system, method and apparatus of the present invention use a compact optical approach within an optical see-through display to performing occlusion, as opposed to using some form of video acquisition and graphics manipulation as done in video see-through displays. The benefit of the invention is that the system is compact and optical see-through because optical see-through displays are much faster than video see-through displays and they provide excellent resolution of the real scene because the scene is not sampled by cameras, instead, the human eye gets a direct view of the real world.

To overcome the problems and limitations of the prior art, the system, apparatus and method of the present invention is based on a reflective spatial light modulator, which has a resolution of 1280×1024, a response time within microseconds, and allow optimal compactness of the optical system. The increased response time is due to faster switching in ferroelectric liquid crystal within microseconds compared to numatic liquid crystals, which are an order of magnitude faster than the transmissive masks such as milliseconds or in best case scenario sub milliseconds. Per eye, the compactness is obtained using two lenses, either a single polarizing x-cube prism or a free standing wire grid polarizing structure, and a reflective spatial light modulator. The ferroelectric liquid crystal on silicon (F-LCOS) is a commercially available product from CRL Opto, United Kingdom. See Application Guide for CRL Opto SXGA FLCOS displays, CRL Opto Limited, United Kingdom (2003) [online]. [Retrieved on May 2, 2005]. Retrieved from: http://www.crlopto.products/product_support.htm.

In the prior art transmissive mask approach of ELMO-4, the liquid crystal display module reported a contrast ratio of 1:100. The F-LCOS, which is used as one implementation of the spatial light modulator panel in an embodiment of the present invention, is reported to yield a contrast ratio greater than approximately 1:200. F-LCOS also provides a light throughput between 40-50% of what the scene would provide for the real world objects. For the virtual objects, a light throughput of approximately 50% is achieved if the micro display used to paint the images is polarized such as liquid crystal display and ferroelectric liquid crystal on silicon panels, or approximately 100% for unpolarized displays such as organic light emitting diodes (OLEDs).

SUMMARY OF THE INVENTION

A primary objective of the present invention is to provide methods, apparatus, and systems of compact optical see-through head worn displays with occlusion support.

A secondary objective of the present invention is to provide methods, apparatus, and systems for displays where virtual objects are able to occlude real objects.

A third objective of the present invention is to provide methods, apparatus, and systems having a spatial light modulator (SLM) which allows viewers to block or pass certain parts of a scene which is viewed through a head mounted display.

The invention includes a novel optical see-through head worn display that is capable of mutual occlusions.

The system, apparatus and method of the present invention includes a compact optical display system having a lens for collecting light from a scene, in a telecentric manner, a polarizer adjacent to the lens, a prism adjacent to the polarizer and a reflective spatial light modulator adjacent to the prism for receiving and modulating said light from said lens to produce a modulated output. An image source displays a virtual image and an eyepiece is provided for mapping the modulated output back to said scene, wherein a user views said output with a perception of indifference between said virtual image overlaid on said scene.

Mutual occlusion is an attribute of an augmented reality display where real objects can occlude virtual objects and virtual objects can occlude real objects. For a user to achieve the perception of indifference between the real and the virtual images overlaid on the real environment, mutual occlusion is a strongly desired attribute for certain applications.

In an embodiment, the optical display system is used with a compact optical head worn display. In this embodiment the compact optical head worn display includes a headpiece and the optical display system includes a spatial light modulator for selectively blocking and selectively passing selected scene from original scene images to a user wearing the head worn display; a lens for imaging the original scene images onto the spatial light modulator; and an eyepiece for mapping back the modulated image back to the original scene, wherein the display is useful for virtual objects able to occlude real objects.

In another embodiment, the optical system occludes real objects with virtual objects by combining a computer generated image with a modulated version of an original scene and imaging the combined image and scene back to a user. In an embodiment, the optical system is used in a head mounted display.

In another embodiment, the method of occluding real objects with virtual objects in a head mounted display includes combining a computer generated image with a modulated version of an original scene mapping the combined image back onto said original scene with approximately a 1:1 magnification and upright orientation without left-right reversal. Combining includes imaging the original scene selectively blocking and selectively passing a portion of said original scene to produce a modulated image that is mapped back to the original scene to provide a display that is useful for displaying virtual objects occluded with real objects.

Further objects and advantages of this invention will be apparent from the following detailed description of the presently preferred embodiments which are illustrated schematically in the accompanying drawings.

DESCRIPTION OF THE PREFERRED EMBODIMENTS

Figure 1:
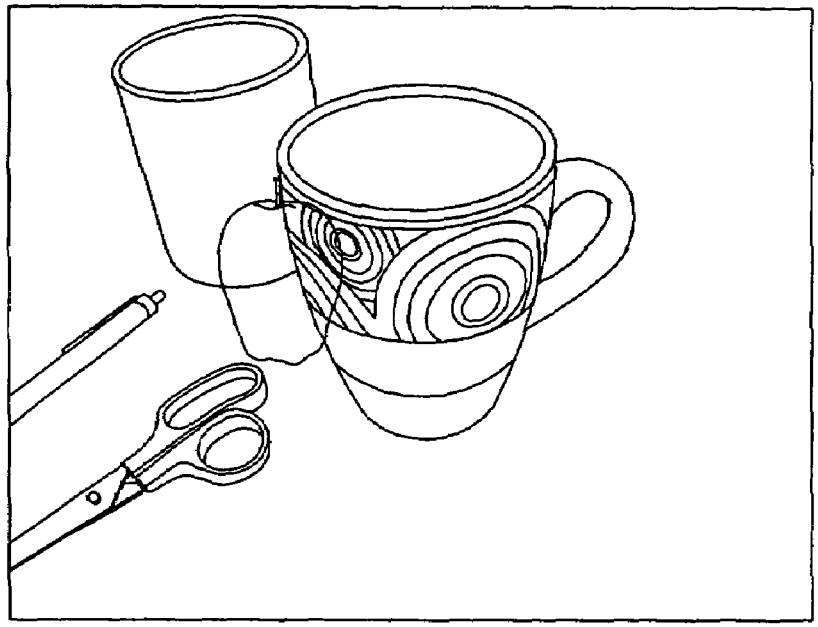
FIG. 1 illustrates a virtual apple overlaid on a real scene viewed using a beam splitter based head mounted display.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

The following is a list of the reference numbers used in the drawings and the detailed specification to identify components.

| | |
|---|---|
| 100 | optical system |
| 105 | objective lens |
| 110 | polarizer |
| 115 | x-cube prism |
| 120 | spatial light modulator |
| 130 | eyepiece |
| 140 | micro display/LCD |
| 150 | chief rays |
| 160 | entrance pupil |
| 165 | exit pupil |
| 170 | eye |
| 180 | intermediary image plane |
| 190 | Scene |
| 900 | test fixture |
| 905 | light source |
| 910 | diffuser sheet |
| 915 | transparency |
| 920 | first lens |

-continued

| | |
|---|---|
| 925 | polarizing beam splitter |
| 930 | liquid crystal optical shutter |
| 940 | F-LCOS/LCD |
| 945 | second lens |
| 950 | driver |

Depending on the optical properties of a material, light is either transmitted through the material, reflected, or it is absorbed by a material. Occlusion is a result of light propagation and attenuation through different materials within a scene. η is defined to be the complex refractive index, $\rho=n+i\cdot\kappa$, wherein n is the real part of the refractive index and κ is the complex part of the refractive index related to a [$cm^{-1}$], the absorption coefficient. The refractive index, α, and length of material determine whether an appreciable amount of light will be transmitted through an object.

Actually, occlusion is a concept familiar in daily life. For example, a tall person sitting in a theatre would block the light from the theatre stage for the people immediately in the row behind since light is not transmitted through people. Therefore, the tall person is occluding the field of view of the people sitting in the immediate row behind.

Figure 2:
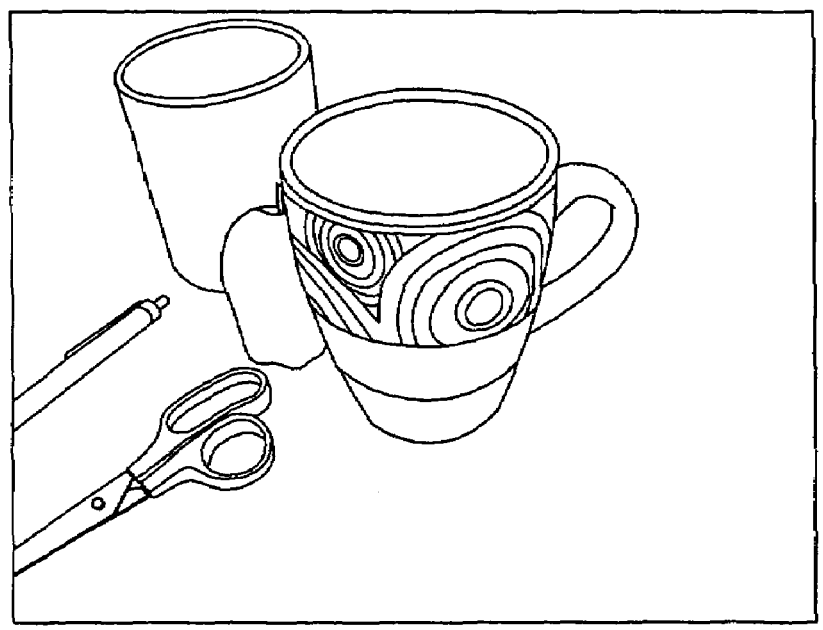
FIG. 2 illustrates a virtual apple overlaid on a real scene viewed using an ideal occlusion based head mounted display.

A visual example of occlusion in the context of augmented reality depicted in FIG. 1 which illustrates a case where a virtual apple is overlaid on a real scene using a conventional head worn display. As shown, the apple is semi-transparent as a result of the transmission of the beam splitter. FIG. 2 illustrates a virtual apple overlaid on a real scene through a head mounted display that supports occlusion. In this example, the apple occludes the cup behind it and is occluded by the cup in front of it, consistent with our daily experience of objects mutually occluding each other.

Figure 3:
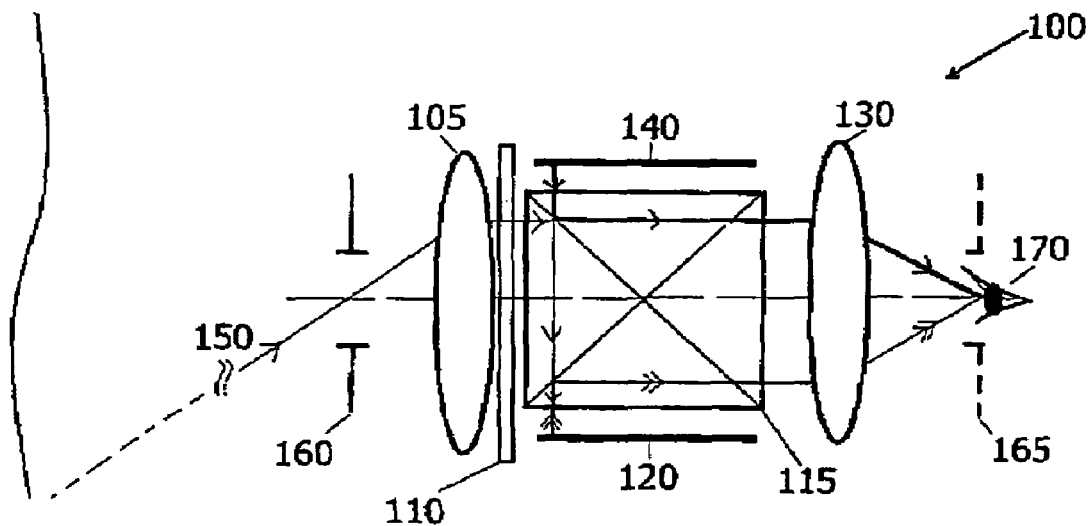
FIG. 3 is a plan view of an optically compact display system with occlusion components according to an embodiment of the present invention.

As shown in FIG. 3, the optical system of the present invention includes an objective lens 105, a polarizer 110, an x-cube prism 115, a reflective spatial light modulator 120 (e.g. reflective spatial light modulator (F-LCOS), DMD), a micro display 140, and an eyepiece 130.

The objective lens 105 collects the light from the scene, in a telecentric manner, and delivers it to the spatial light modulator 120 for modulating the content of the scene (pass or block light from the scene). An objective lens is telecentric in a given space if the chief rays, the rays in the field of view that pass through the center of the pupil, are parallel to one another in that space. Most commonly, the chief rays are also parallel to the lens axis and perpendicular to the object and/or image planes that are perpendicular to the axis. The image on the spatial light modulator is an intermediary image since the image lies between the object and image spaces. In optics, the space an object lies in is defined to be the object space and an analogous definition exists for the image space. In a preferred embodiment, the spatial light modulator used in the present invention is modeled as a flat mirror with a quarter-wave plate, an optical device that rotates polarization by 90 degrees in the case of double pass. The quarter-wave plate, or an equivalent polarization rotator, is required to provide polarization throughout the system.

In the system of the present invention, telecentricity in the intermediary space is required for three reasons. First, from a first order layout perspective, the system requires a 90 degree angle of incidence for the chief rays in order for the spatial light modulator to operate efficiently. The optical light path is shown in FIG. 3. A deviation from the 90 degree requirement causes vignetting, a loss of light which occurs when an image-forming bundle is truncated by two or more physical structures in different planes.

Second, since the design used in the preferred embodiment is based on an x-cube polarizing combiner, it is important not to strike the x-cube at an angle. This is analogous to a converging beam of light passing through a plane parallel plate at an angle which results in severe optical aberrations. Thirdly, for a given chief ray angle, imaging of various object planes or defocus of the spatial light modulator does not change the image height which facilitates performing the occlusion for a given region of the scene around the chief ray.

Once the scene is modulated according to the application needs, the eyepiece takes the modulated light output and maps it back to the original scene. Even though delivering a collimated image to the eye is optional, and not a requirement for the system of the present invention, for purposes of illustration and discussion, the design is discussed for a collimated image in visual space. The design for a collimated image in visual space is an appropriate selection for virtual objects displayed in the far field. To generate a collimated image from the output of the spatial light modulator, the front surface of the eyepiece 130 is placed a front focal length away from the spatial light modulator 120. The height of the intermediary image is fixed by the height of the spatial light modulator 120, therefore if the focal length of the eyepiece 130 matches the focal length of the objective lens 105, the field of view for both the objective lens 105 and the eyepiece 130 are approximately the same, which is referred to as mapping the modulated image back onto the scene.

Figure 4:
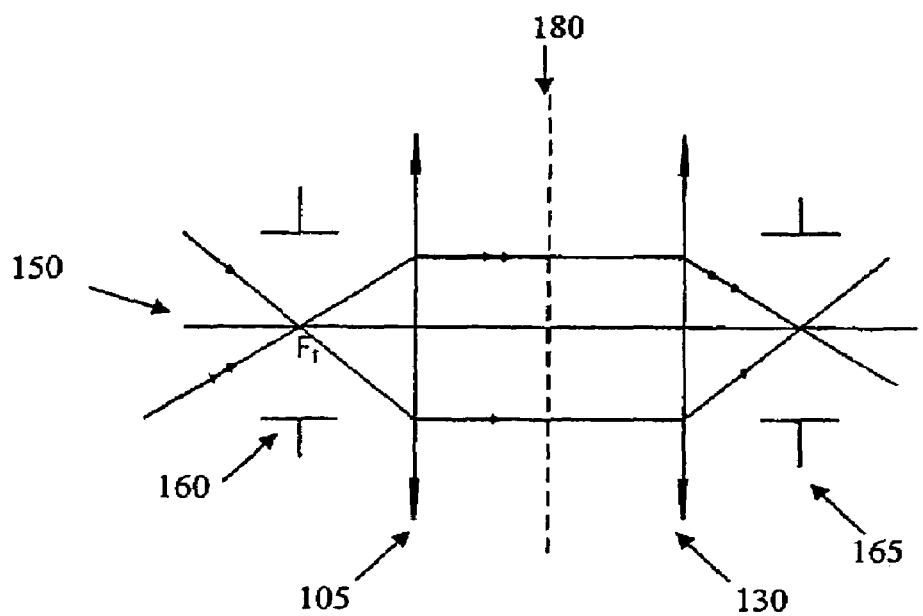
FIG. 4 shows an unfolded optical layout of the system shown in FIG. 3.

FIG. 4. shows an unfolded optical layout of the system configuration shown in FIG. 3. The unfolded optical layout is easier to analyze and understand than the configuration of system 100. It is typical to unfold reflective systems with lens elements having the same power and then considering the reflections as transmission through the new elements. In the system of the present invention, flat mirrors that have no optical power are used. Therefore, care must be taken when unfolding the system and setting the distances between the elements.

As shown in FIGS. 3 and 4, the entrance pupil 160 is placed approximately at the focal point of the objective lens 105 to force the chief rays 150 in the intermediary image space to be parallel to the optical axis, so that the system is telecentric within that space. It is known in the art that where the chief rays cross the optical axis determines the locations of the pupils along the optical axis. Therefore, after the telecentric intermediary space, the chief ray 150 focuses down at the focal point of the eyepiece 130 to form the exit pupil 165 of the system 100. Ideally, to accommodate users wearing eyeglasses, the exit pupil is located approximately 25 mm away from the last surface, the eyepiece 130 in this example. An exit pupil diameter of approximately 9-12 mm is preferred, within which the pupil of the eye 170 (i.e., 2-4 mm in diameter) is located and moves naturally within ±20 degrees as described in Kocian, D. F., "Design considerations for virtual panoramic display (VPD) helmet systems," Armstrong Aerospace Medical Research Laboratory, Visual Display Systems Branch, Wright Patterson Air Force Base, Dayton, Ohio 45433-6573 (1988). Increasing the size of the pupil of the instrument in comparison to the eye pupil increases the allowable eye motion. However, increasing the allowable eye motion, which increases the size of the corresponding instrument eyepiece, decreases the compactness of the device. In the preferred embodiment, the system includes a 9-mm pupil to provide the user with the ±21 degrees natural eye motion while maintaining the maximum compactness without compromising the field of view.

In the next step, the desired upright orientation of the final image with respect to the eye is verified. To verify orientation, it is necessary to consider the system 100 shown in FIG. 3 instead of the unfolded optical layout shown in FIG. 4, and take into consideration the effect reflection from a mirror has on the upright orientation.

Figure 5A:
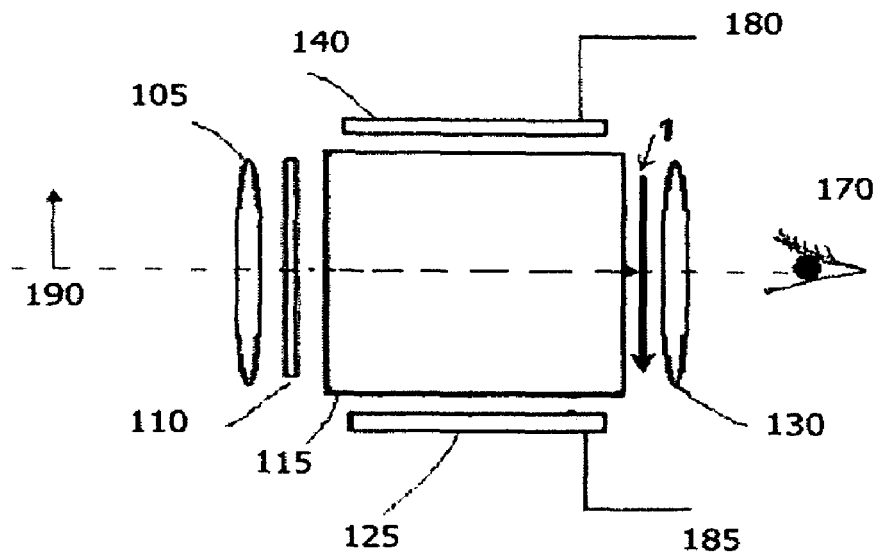
FIGS. 5a, 5b and 5c are plan views showing the image orientation of the device of FIG. 3.
Figure 5B:
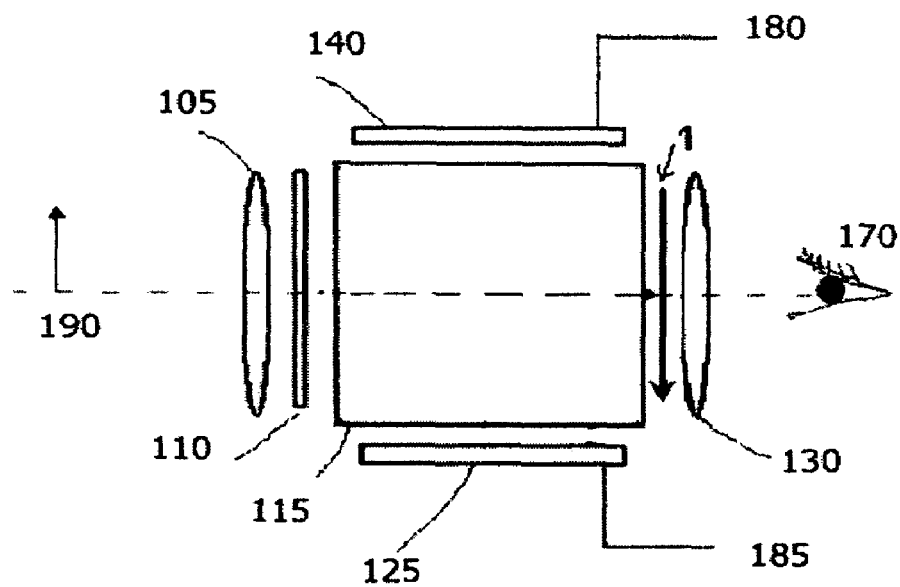
Figure 5C:
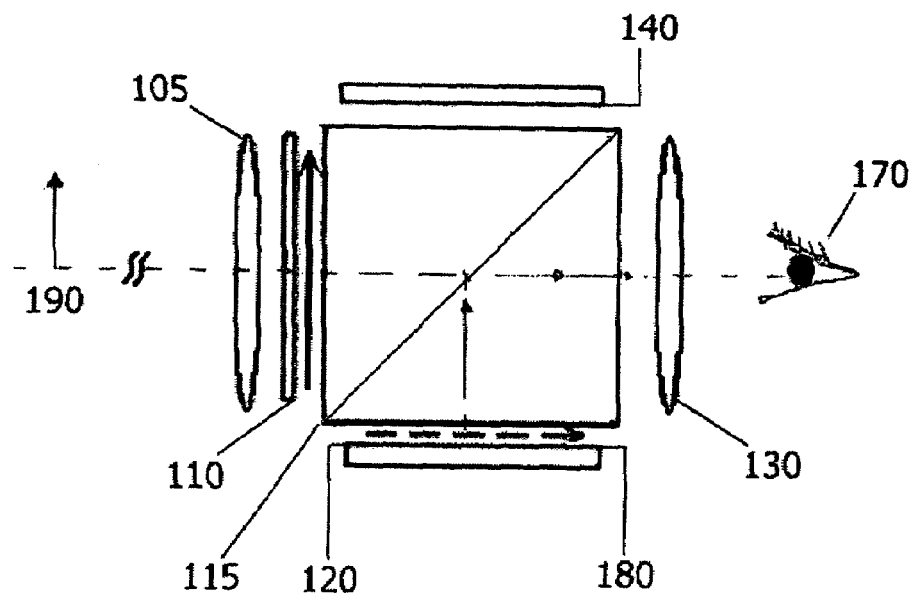

FIGS. 5a-c are used for verifying image orientation. The object 190, which is illustrated as an upright arrow to the left of the objective lens 105 and in this example, the object is assumed to initially have an upright orientation. The object is first imaged through the objective lens 105 and has an inverted orientation as indicated by the solid black line between the x-prism 115 and the eyepiece 130 as shown in FIG. 5a. By placing the polarizer between the objective lens 130 and the x-prism 115, the transmitted light is s-polarized, therefore, it strikes the s-reflective coating in the x-cube prism 115. The image orientation on reflection, shown in FIG. 5b, is represented by a solid black line between the x-prism 115 and the spatial light modulator. The spatial light modulator reflects the image and changes the polarization of the transmitted light with the pixel in the on state. The transmitted light becomes p-polarized and strikes the p-reflect coating on the x-cube 115 and is directed towards the user's eye 170 as shown by the arrows in FIG. 5c. The orientation of the image after the p-reflect mirror is shown in FIG. 5c as the dark solid arrow between the x-prism and the polarizer, which is the final step in verifying that the final image has an upright orientation.

Experimentally, an optical system according to the present invention was designed beginning with a first order optical layout of the objective lens. The expected result of the objective lens is to image a preferred specified field of view onto the spatial light modulator for selectively turning pixels on and off in the real world scene. In this experiment the objective lens was designed for a field of view (FOV) of approximately 40 degrees. Once the field of view and the size of the spatial light modulator are known, the focal length of the lens is determined by a simple ratio related to the size of the modulator and the FOV. In an analogous process, the horizontal and the vertical field of view are determined to be ±15.81 degrees and ±12.77 degrees, respectively. Based on this design, erection of the image using optics is not required, increasing the compactness of the final device. The spatial light modulator 125 and the micro display 140 are approximately one inch, yielding a focal length of about 31 mm for a 40 degree FOV. Taking into account the required reflections, approximately 45 degrees in this experiment, the x-cube 115 is approximately a one inch cube. Finally, in this first experiment, the ratio of the focal length f to the diameter D of the lens (f/D) is determined to be approximately 3.75. In an embodiment, ferroelectric liquid crystal on silicon (F-LCOS) is used as the spatial light modulator in an optical designs up to f/1.8.

The pixel period for the F-LCOS is on the order of approximately 30 microns, therefore, the maximum spatial frequency is approximately 36.27 cycles/mm (i.e. 1000/(2*13.62) cycles/mm). With this modulator, image information with a higher spatial frequency (i.e. finer detail) is not observed. The standard value of the MTF at the maximum spatial frequency is 20%.

For the optical design, approximately the same optics are used for the objective lens and the eyepiece. The advantage of using the same optics is cancellation of distortion for the real scene, given that the eyepiece distortion is of opposite sign to that of the objective lens by symmetry. Regarding the virtual image, the distortion is that of the eyepiece. The distortion of the eyepiece can be compensated either in software, hardware electronics, or optically with methods well known to the art of lens design.

Figure 6:
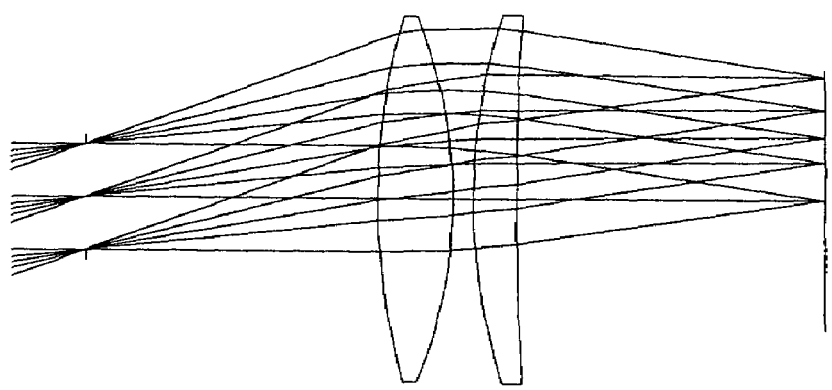
FIG. 6 shows the layout of a two element system according to an embodiment of the present invention.

In summary, when designing the optical system it is preferable to obtain a physically compact wide angle telecentric objective of approximately 40 degrees that is separated from the F-LCOS by approximately 25.4 mm to provide adequate space for the x-cube. The telecentricity requirement imposed that the entrance pupil is preferred to be outside of the system for which a rear landscape lens is used. The optical system also preferably functions with a wide spectrum and with a fairly large field of view. Therefore, an optional second element is used to provide aberration correction. In a preferred embodiment, the first element is a conventional optical element with spherical surfaces and the second element is made into a diffractive optical element (DOE) on a spherical or aspherical substrate with a single diffractive surface to balance chromatic aberrations to achieve compactness and good image quality. FIG. 6 shows the layout of the two element system discussed above. The chief rays are shown to be approximately parallel to the optical axis to achieve the telecentricity requirement. As shown in FIG. 6, at the edge of the field, the distortion is less than 8% in this embodiment.

Figure 7:
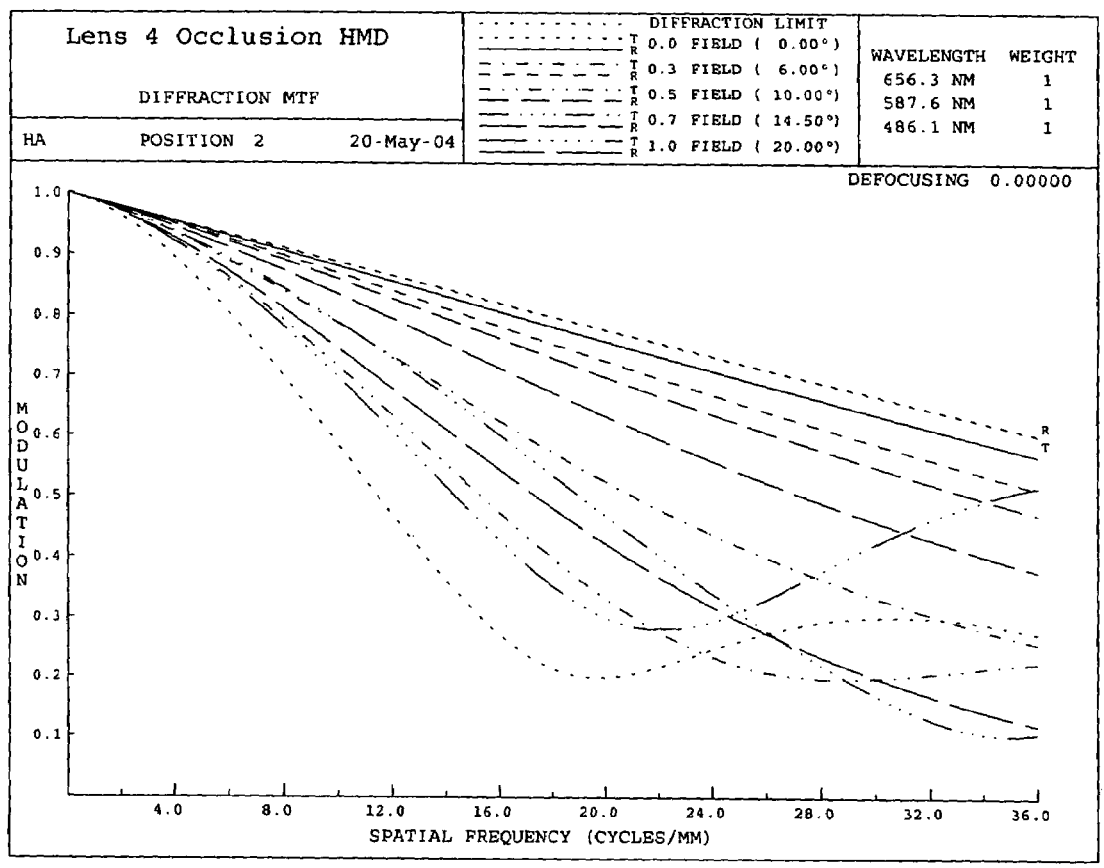
FIG. 7 shows the MTF of the objective lens for a 2 mm pupil.

FIG. 7 shows the diffraction MTF of the objective lens for a 2 mm pupil. As shown, at maximum spatial frequency, the average MTF across the field of view is about 30%.

Figure 8:
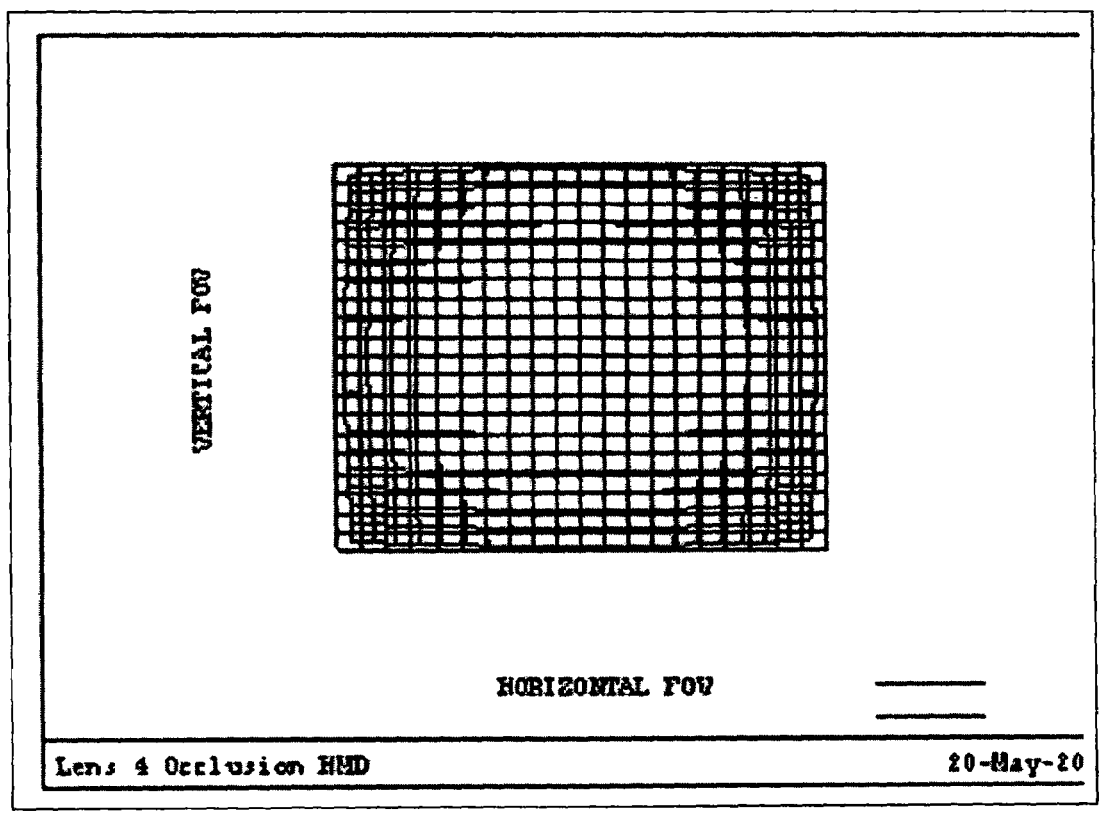
FIG. 8 shows the distortion grid of the two element system shown in FIG. 6.

FIG. 8 shows the distortion grid of the two element system previously described. At the edge of the field, the distortion is less than 8%. This is the distortion of the virtual scene. Pre-warping the image on the micro display (e.g. LCD), we can correct for this distortion. As previously discussed, the real scene is not distorted due to the symmetry of the system, in the case of infinite conjugates.

Figure 10:
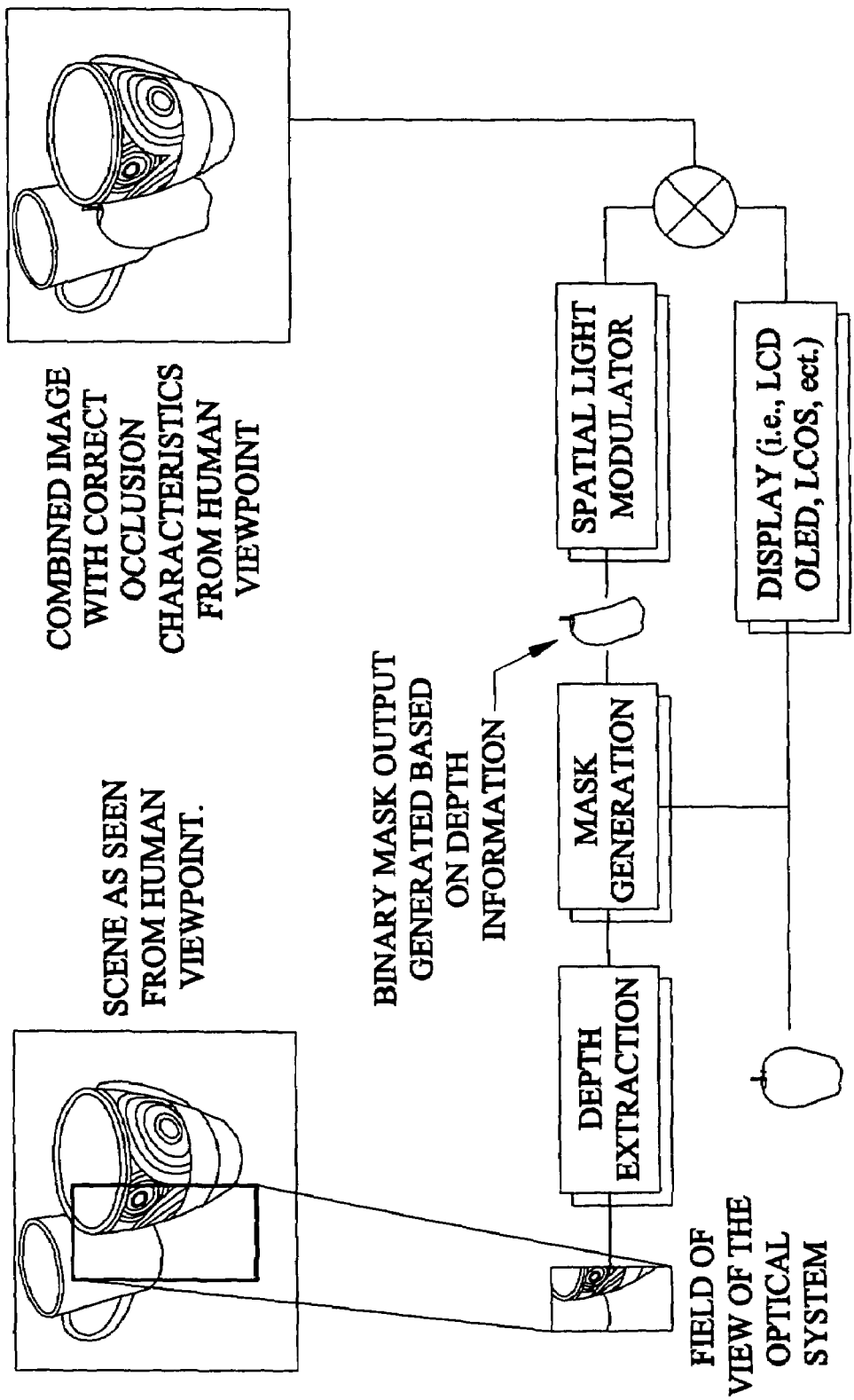
FIG. 10 is a block diagram of a complete mutual occlusion system.

FIG. 10 is a block diagram of a complete occlusion system. A complete would combine the said optical system described in FIG. 3 with a depth extraction mechanism. Occlusion masks are created by combining depth information from the scene with information about the virtual object. The mask is displayed on the spatial light modulator which modulates portions of the scene to implement the desired occlusion effects. There are commercially available 3d depth extraction cameras that operate at video rates which make real-time operation of the complete system feasible.

Laboratory Experiment

Figure 9:
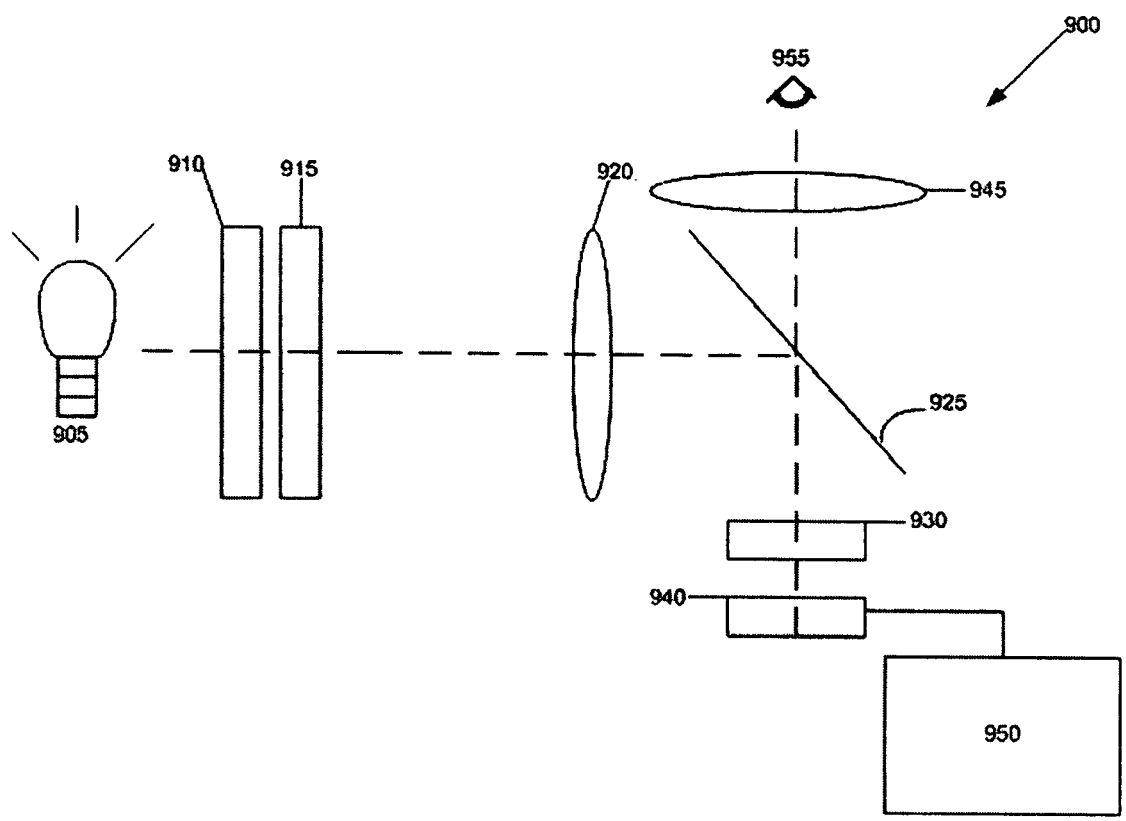
FIG. 9 is a block diagram of an experimental system according to the present invention.

An experimental optical system 900 was configured as shown in FIG. 9 and was instrumented with commercially available components to demonstrate feasibility of the optical approach to occlusion as disclosed by the present invention. The components of the optical system 900, listed in the order of light propagation path and starting at the left and propagating to the right include, a white light source 905, a diffuser sheet 910, a transparency 915 as the object, an achromatic lens 920 (i.e. doublet), a Moxtek wire-grid polarizing beam splitter 925, a liquid crystal optical shutter 930 and an F-LCOS 940 from CRL Opto as the spatial light modulator connected to the driver electronics 950. Note that the F-LCOS 940 is physically located underneath the optical shutter 930. The user or a camera taking a picture of the modulated scene would look through the image formed by the second lens 945.

The nature of operation of the F-LCOS module 940 in the system has a direct impact on the results achieved. Based on the nature of the F-LCOS operation, use of the liquid crystal shutter is required in the system. The F-LCOS operates with a field sequential scheme as described in SXGA Field Sequential Color Application Note, CRL Opto Limited, United Kingdom (2003) [online]. [Retrieved on May 2, 2005]. Retrieved from: http://www.crlopto.products/product_support.htm. For a typical application, cycling through the red, green and blue pixels is required and each cycle consists of displaying one color (for example, red) and providing telecentric illumination that matches the color displayed at that moment. Additionally, use of a 50:50 drive scheme is necessary when the F-LCOS is used. Use of the 50:50 drive scheme means that approximately half the time allocated for a pixel is displayed on the display/SLM and the other half is used driving the display/SLM with the negative of the pixel. In the present invention, the system blocks/passes parts of the scene such that the system operates in a black and white mode. In a 50:50 drive scheme, the display shows a "white" pixel for half the pixel cycle and a "black" pixel for the remaining portion of the pixel cycle. The 50:50 drive scheme also provides DC balance for the liquid crystal to avoid charge migration and requires a shutter to block the negative image. Due to the persistence of the human visual system, the positive and negative cycles are integrated in the eye, resulting in a low contrast of approximately 1:2 image when the shutter is not used.

Depending on the orientation of the polarizers with respect to the F-LCOS module, one color passes (for example, white) the light and the other color (for example, black) blocks the light. It is also necessary that the input light to the display be linearly polarized. The simplest model for the F-LCOS is an electronically controllable half-wave plate overlaying an approximately perfect flat mirror as previously described. If the pixel is turned off, or "black", the orientation of the half-wave plate is aligned to the polarization, with no rotation of the polarization occurring. Thus the output light is blocked by the analyzer. If the pixel is turned on, or "white", the half-wave plate is rotated at 45 degrees (ideal) to the input polarization, resulting in an output polarization of the light at approximately 90 degrees to the input. A deviation from the 90 degree requirement causes vignetting, a loss of light which occurs when an image-forming bundle is truncated by two or more physical structures in different planes. To reduce vignetting, in a preferred embodiment, the system uses two Moxtek polarized beam splitters located side-to-side. The image is modulated on the F-LCOS, changes polarization, is reflected back and is transmitted through the beam splitter.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A compact optical see-through system for a head worn display comprising:
    an optical system having telecentricity in an intermediary space for selectively blocking and selectively passing selected portions of a scene from original scene images to produce a modulated output, the optical system including:
        an objective lens having a focal point placed at an entrance pupil of the optical system to collect light from the original scene for imaging said original scene images onto said optical system;
        a polarizing structure including a polarizer and an x-cube prism adjacent to the objective lens for polarizing the original scene from the objective lens to produce a polarized intermediary image;
        a 3D real-time depth extraction system to determine an occlusion mask;
        a spatial light modulator for receiving and modulating the polarization of the intermediary image to produce the modulated image based on the occlusion mask;
        a microdisplay for displaying the virtual image, a light from the microdisplay being combined with a light from the spatial light modulator using the polarizing structure and reflecting the modulated intermediary image; and
    an eyepiece with a focal point placed to form an exit pupil of the optical system for mapping said modulated image back to said original scene images for viewing by a user wearing said see-through head worn display, wherein said see-through head worn display displays virtual objects while occluding real objects and real objects occluding virtual objects.

2. The display of claim 1 wherein said spatial light modulator is a reflective spatial light modulator to increase compactness.

3. The display of claim 1 wherein said eyepiece is located approximately a front focal length away from said spatial light modulator for delivering a collimated image to said user.

4. The display of claim 1 wherein said compact optical see-through head worn display is one of a monocular, biocular, and binocular.

5. A compact optical display system having telecentricity in an intermediary space capable of mutual occlusions, the optical system consisting essentially of:
    a lens having a focal point placed to form an entrance pupil of the optical system for collecting light from a scene, in a telecentric manner;
    a polarizer adjacent to the lens for polarizing said light from said lens;
    a prism adjacent to the polarizer;
    an image source to provide a computer-generated image;
    a reflective spatial light modulator adjacent to the prism for receiving and modulating said light from plural pixels of said scene on a pixel by pixel basis and said computer generated image to produce a modulated output to image a preferred specified field of view onto the spatial light modulator for selectively turning pixels on and off in the real world scene; and
    an eyepiece having a focal point placed to form an exit pupil of the optical system for mapping said modulated output back to said scene, wherein a user views said output with a perception of indifference between said computer-generated image overlaid on said scene.

6. The display system of claim 5 wherein said lens includes:
    a telecentric objective lens.

7. The display system of claim 5, wherein said prism includes:
    one of a polarizing structure, an x-cube polarizing prism or a free standing wiregrid polarizing structure.

8. The display system of claim 5, wherein the image source comprises:
    one of a micro display, a liquid crystal display and an OLED.

9. A method of occluding real objects with virtual objects in an optical see-through head mounted display, consisting essentially of the steps of:
    combining a computer generated image from an image source with a modulated version of an original scene by an optical system having telecentricity in an intermediary space, comprising the steps of:

placing a focal point of an optical lens at an entrance pupil of the optical system;

collecting light from a scene, in a telecentric manner, by the optical lens to produce an inverted image of the scene;

polarizing said inverted image of said scene by a polarizer adjacent to the lens;

reflecting the polarized image by a prism to a reflective spatial light modulator;

modulating the polarized image of the scene reflected from the prism then reflecting the modulated image back to the prism; and reflecting the modulated image by the prism to an exit pupil of the optical system;

placing a focal point of an eyepiece to form the exit pupil of the optical system; and mapping the combined image by the eyepiece back onto said original scene with approximately a 1:1 magnification and upright orientation to occlude real objects with virtual objects in an optical see-through system for a head mounted display.

10. The method of claim 9, wherein said combining step comprises:

imaging the original scene; and selectively blocking and selectively passing a portion of said original scene to produce a modulated image.

11. The method of claim 10, wherein said imaging step comprises:

mapping the modulated image back to the original scene, wherein the display is useful for displaying virtual objects occluded with real objects.

* * * * *